Oct. 30, 1945.　　　R. J. INGHAM, JR　　　2,387,909
TEMPERATURE COMPENSATED BOURDON TUBE INSTRUMENT
Filed Aug. 24, 1943　　　2 Sheets-Sheet 1
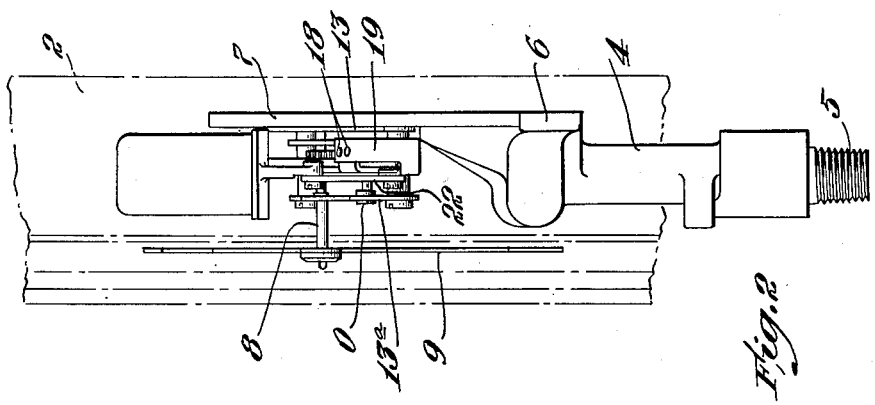
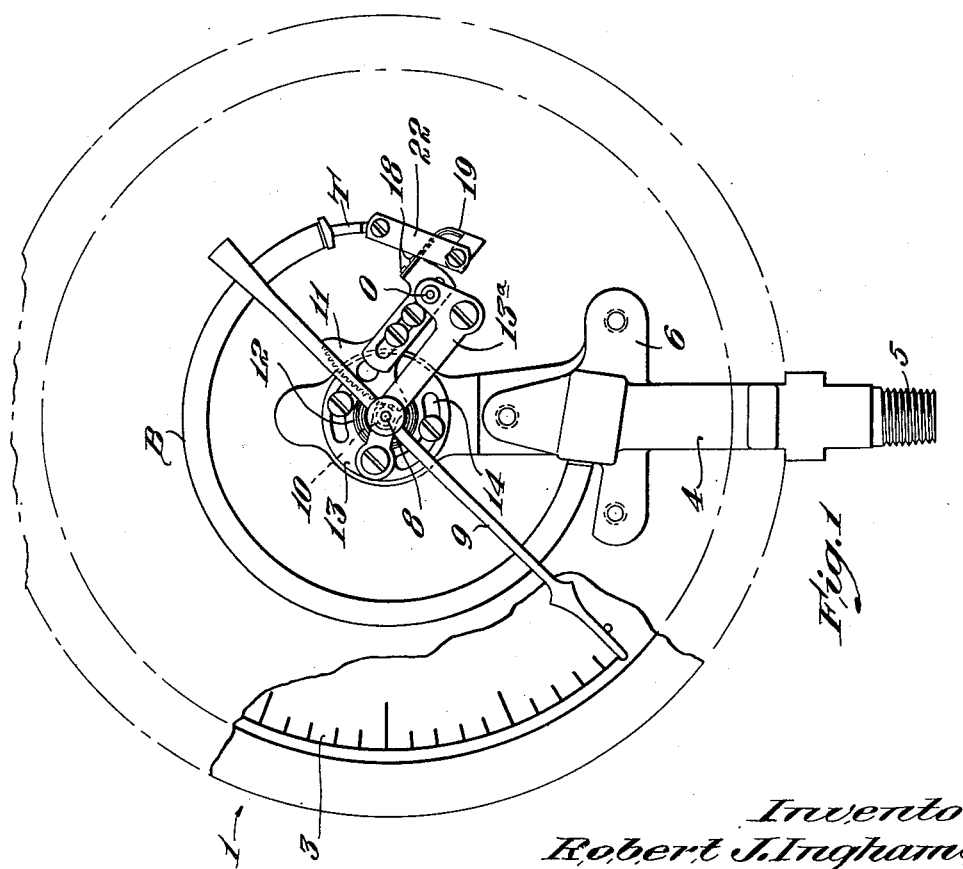
Inventor
Robert J. Ingham Jr.
by Roberts Cushman & Woodberry
Att'ys.

Oct. 30, 1945.  R. J. INGHAM, JR  2,387,909
TEMPERATURE COMPENSATED BOURDON TUBE INSTRUMENT
Filed Aug. 24, 1943  2 Sheets-Sheet 2

Inventor
Robert J. Ingham Jr.
by Roberts, Cushman & Woodberry
Att'ys.

Patented Oct. 30, 1945

2,387,909

UNITED STATES PATENT OFFICE 2,387,909

TEMPERATURE COMPENSATED BOURDON TUBE INSTRUMENT

Robert J. Ingham, Jr., Fairfield, Conn., assignor to Manning, Maxwell & Moore, Incorporated, New York, N. Y., a corporation of New Jersey Application August 24, 1943, Serial No. 499,803

9 Claims. (Cl. 73—393)

This invention pertains to indicating instruments of the dial type, for example pressure gauges, dial thermometers, etc., and relates more especially to an improved construction whereby the effects of variations in the temperature of the ambient medium are substantially compensated.

When a gauge is subjected to ambient temperatures differing materially from the temperature at which the instrument was calibrated, the indicated values are erroneous. The error is a combination of two factors:

(1) The linear expansion or contraction of the various parts of the gauge; and (2) The change in the modulus of elasticity of the Bourdon tube.

The error resultant from linear expansion or contraction is a constant amount at any point in the range of the instrument. On the other hand, the error caused by the change in the modulus of elasticity of the Bourdon tube increases with increase in pressure. Its effect may be likened to that of replacing the Bourdon tube of a properly calibrated gauge with a tube of a different pressure rating without altering the position of the other parts. This error is generally large as compared with that caused by linear expansion. Generally, when a pressure gauge is subjected to ambient temperatures which are lower than the temperature at which the gauge was calibrated the readings will have a minus error and for higher temperatures the readings will have a plus error.

The principal object of the present invention is to provide an indicating instrument of the class described having means operative automatically to compensate for variations in ambient temperature so that the indications of the instrument will not be substantially affected by such outside variations. A further object is to provide a gauge or similar instrument of substantially usual construction as respects all of its major parts, but including the improved temperature compensating means of the present invention. A further object is to provide an instrument of this type having provision for compensating temperature variations in modulus of elasticity of the Bourdon tube and which at the same time compensates for linear expansion or contraction. A further object is to provide a temperature compensated instrument of a commercially practical type wherein the compensating means is simple, inexpensive and reliably accurate.

Other and further objects and advantages of the invention will be pointed out in the following more detailed description and by reference to the accompanying drawings wherein Fig. 1 is a fragmentary front elevation of a pressure gauge or similar instrument embodying the present invention, certain portions of the gauge being broken away or shown in broken lines in order to illustrate the novel features of this invention;

Fig. 2 is a side elevation from the right-hand side of Fig. 1;

Figure 4:
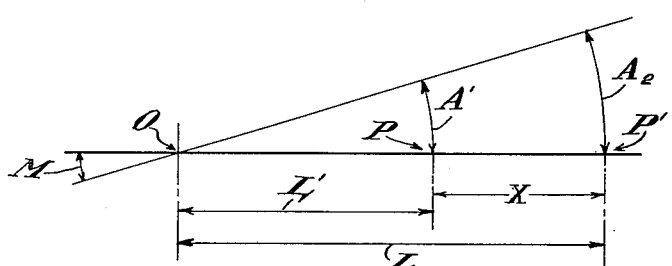
Fig. 4 is a diagram illustrative of the principle of the invention.

Referring to the drawings, and particularly to Fig. 4, let it be assumed that the point O is the pivotal axis of the usual segment lever and that the angle M is the maximum angle through which the toothed end of this lever is to swing. If the point P be the point on the segment lever to which is pivotally connected the link which transmits motion to the lever from the Bourdon tube, then the arc A' represents the maximum distance through which this point P should swing. If, however, the tip of the Bourdan tube, due to temperature increase, should move through an arc greater than the arc A', manifestly the toothed end of the segment lever would move through an angle greater than M thus producing an erroneous reading. On the other hand, if upon the occurrence of such excess movement of the tube tip, the point P of connection of the link to the segment lever could be moved to some other position, for example to the position P' which moves through an arc $A_2$ (greater than the arc A') corresponding to the excess movement of the tube tip, then the toothed end of the segment lever would still move through the angle M.

Such movement of the point P to the point P' represents an effective increase in the length of the segment lever, the original length being represented by the character L'. This greater length is represented by the character $L_2$, and the increase by the letter X. This distance X may be mathematically determined as follows:

$$L_2 : A_2 = L' : A'$$

$$L_2 = \frac{L' A_2}{A'}$$

But $$L_2 = L' + X$$

$$\therefore X = \frac{L' A_2}{A'} - L'$$

Referring to the drawings, the numeral 1 designates an instrument of the class described, herein illustrated as a pressure gauge having an outer casing 2 and a graduated dial 3, the casing being supported upon a stem member 4 having a screw-threaded nipple 5 at its lower end for connecting it to a supply pipe. The stem 4 also includes a bracket portion 6 to which the casing is secured, the bracket portion 6 having the upstanding rear member 7 provided at its upper end with a pad to which the movement mechanism is secured. The mechanism of the gauge includes a rotary staff 8 pivoted to turn in the movement frame and carrying the index 9 which cooperates with the graduations on the dial. The staff also carries the usual pinion 10 which meshes with a gear segment 11. The usual hair spring 12 is provided to take up backlash in the parts of the movement mechanism. As here illustrated, the movement frame is carried by a disk member 13 rotatable with respect to the pad portion of the bracket 7 and provided with arcuate slots 14 for the reception of screws by means of which the disk and movement frame may be swung for calibration purposes, all as more fully disclosed in the patent to Hopkins No. 1,484,068, dated February 19, 1924. The instrument, as here specifically disclosed, comprises the Bourdon tube B fixed at one end to the bracket 6, and having a stiff but manually bendable tip bracket T at its free end.

The gear segment 11 is at the free end of an inner lever arm 15, the opposite end of said arm being fixed to a staff O turning in bearings in an extension 13ª of the movement frame. A longitudinally slotted elongate tailpiece 15ª, adjustably united to the lever arm 15 by screws 16, projects to the opposite side of the staff O to form the main part 15ᵇ of a second or outer arm of the segment lever. The normal effective length of this second or outer arm is manually adjustable for pressure calibration in accordance with usual practice.

The main part 15ᵇ of the outer arm of the segment lever is provided with a substantially flat upper surface 17ª to which is fixed, by means of rivets 18, a bimetallic connecting element comprising superposed metal strips 19 and 19ª. The strip 19ª consists of material which has a greater coefficient of temperature expansion than the strip 19. The free or outer end portion 19ˣ of this bimetallic element is normally bent at an angle (here shown by way of example as approximately 120°) with respect to the main or inner part of the bimetallic element. The free or outer end portion 19ˣ has fixed thereto a tab 20 disposed in a place substantially parallel to that of the main part 15ᵇ of the second lever arm, this tab 20 constituting the terminal part of the outer arm of the segment lever. A pivot 21 connects this terminal part 20 to the lower end of a link 22, whose upper end is connected by a pivot 23 to the tip bracket T of the Bourdon tube.

It is evident that by relative movement of the parts 15ᵇ and 20 the effective length of the outer arm of the segment lever may be varied. The initial effective length of this outer arm, as measured between the pivot points O and 21, may be represented by the character L' (Fig. 4) and if the terminal element 20 be moved away from the pivot point O, then the effective length of the outer arm of the segment lever may, for example, be represented by the character L₂ representing the distance between the point O and the new position of the pivot axis 21.

Figure 3:
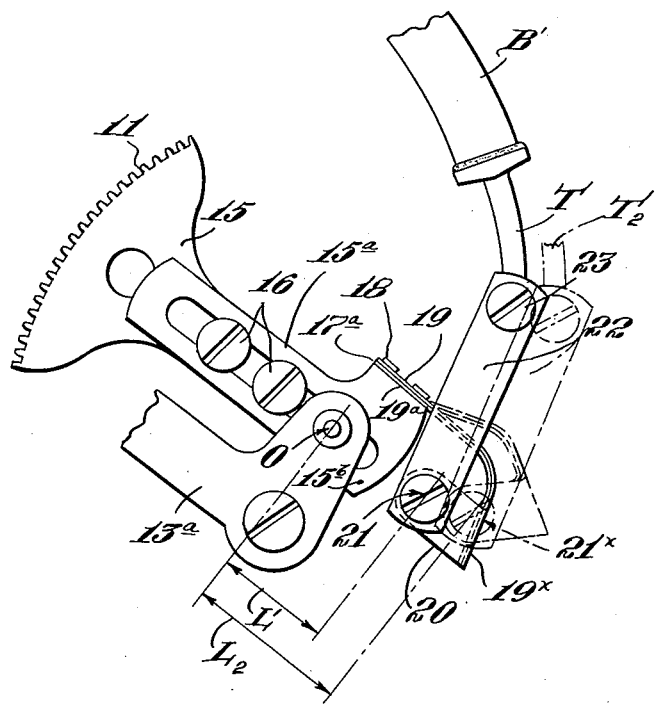
Fig. 3 is a fragmentary front elevation, to larger scale, showing the gear segment lever, the tip of the Bourdon tube, and connections between these parts in accordance with the present invention.

The bimetallic element is so designed that as the temperature of the ambient medium increases, the member 19ª expands faster than the member 19 thus deflecting the part 19ˣ toward the right (Fig. 3) and thus changing the effective length of the outer lever arm, that is to say, changing the position of the pivot axis 21 relatively to the fulcrum axis O, but without thereby varying the position of the segment 11. The bimetallic element is so designed that this increase in the effective length of the outer lever arm exactly compensates for the change in modulus of elasticity of the Bourdon tube in response to a similar temperature change. By this very simple expedient, change in modulus of elasticity of the Bourdon tube resultant from temperature change is compensated for, so that temperature errors due to variations in the Bourdon tube are eliminated. It is obvious that if the temperature decrease, the compensating effects above referred to will likewise obtain, the effective length of the outer arm of the segment lever in such event decreasing instead of increasing.

Assuming that temperature change results only in a change in the modulus of elasticity of the tube, the only result, when a given pressure is applied, is that the tube tip will move to a slightly different distance along its normal arcuate path for each different temperature. The bimetallic element is so designed that as the temperature varies, the point 21 is moved in a predetermined path thereby to change the effective length of the outer arm of the segment lever in substantially the right amount to compensate for the different travel of the tube tip.

However, temperature change not only varies the modulus of elasticity of the tube but it also causes a linear expansion of the gauge parts parts which is independent of the applied pressure. Linear expansion may rock the segment lever in either direction or it may not affect its position at all, depending upon the initial angle between the link 22 and a line joining the axis O of the segment lever with the pivot point 21. This angle may be varied manually during calibration of the gauge either by rocking the movement frame about the axis of the index staff or by bending the tube tip T to the right or left. It is contemplated, in accordance with the present invention, that such a calibration will be made in the manner above suggested, thereby shifting the initial position of the link 22 relatively to the bimetallic element. Thus the path of the point 21 resultant from temperature change will still be such as to compensate for the corresponding change in the modulus of elasticity of the tube.

By way of example of the action of the improved device hereinabove described, let it be assumed that after the gauge has been calibrated, the temperature changes (at constant pressure) so that the tip of the Bourdon tube moves from the position T (Fig. 3) to the position T², such movement being greatly exaggerated for illustrative purposes. The pivot point 21, at the same time, moves from the position indicated in full lines to the position 21ˣ indicated in dotted lines, such movement of the pivot point being in a direction such that it does not affect the position of the segment 11. Thus although the tip of the Bourdon tube has assumed a different position, the effective length of the outer arm of the segment lever has likewise been increased, but without changing the position of the gear segment.

While certain desirable embodiments of the invention have been illustrated by way of example, it is to be understood that the invention is broadly inclusive of any and all modifications such as fall within the scope of the appended claims.

I claim:

1. A dial type Bourdon tube instrument including a Bourdon tube and wherein a gear segment mounted upon one arm of a lever engages a pinion on a rotary staff carrying an index, and wherein motion-transmitting connections, including a link, unite the second arm of the lever to a Bourdon tube, characterized in that the second arm of the lever includes a main part and a terminal part, a pivot uniting the link to said terminal part, the second lever arm also including a bi-metallic element having inner and outer angularly disposed portions, the outer portion extending transversely of the longitudinal axis of the lever and supporting the pivot at a point closely adjacent to said longitudinal axis, the inner portion of the bi-metallic element being secured to the main part of the second arm of the lever, the bi-metallic element being so constructed and arranged that in response to changes in ambient temperature it displaces the pivot along a path substantially coincident with the longitudinal axis of the lever.

2. A dial type Bourdon tube instrument including a Bourdon tube and wherein a gear segment mounted upon one arm of a lever engages a pinion on a rotary staff carrying an index, and wherein one end of a link is united by a pivot to the opposite arm of the lever, the link transmitting motion from a Bourdon tube to the lever, characterized in that the second of said lever arms includes two parts united by a bimetallic element, the pivot being carried by one of said parts and being located substantially on the longitudinal axis of the lever, the bi-metallic element being so constructed and arranged as in response to changes in ambient temperature to move the pivot in a path substantially co-incident with the longitudinal axis of the lever toward and from the fulcrum point of the lever and at such a rate as substantially to compensate for changes in the modulus of elasticity of the Bourdon tube resultant from temperature changes.

3. A dial type instrument including a Bourdon tube and wherein a gear segment mounted upon one arm of a lever engages a pinion on a rotary staff carrying an index, and wherein motion-transmitting connections unite the opposite arm of the lever to a Bourdon tube, characterized in that the second arm of the lever comprises relatively movable parts, one being a terminal element to which one end of a link is pivotally connected, the other end of the link being connected to the tube tip, and a bimetallic element uniting said terminal element to the other portion of said second lever arm, the bimetallic element being constructed and arranged to move the terminal element longitudinally of the lever toward and from the fulcrum of the lever in accordance with changes in the modulus of elasticity of the Bourdon tube resultant from temperature variations.

4. A dial type Bourdon tube instrument including a Bourdon tube and wherein a gear segment mounted upon one arm of a lever engages a pinion on a rotary staff carrying an index, and wherein motion-transmitting connections, including a link, unite the opposite arm of the lever to a Bourdon tube, characterized in that the second arm of the lever comprises relatively movable parts, a pivot uniting one of said parts to one end of the link, the other end of the link being connected to the tube tip, a bimetallic element including angularly disposed end portions, said end portions being fixedly secured, respectively, to said relatively movable lever parts, the angle between the end portion of the bimetallic element varying with temperature changes, the bi-metallic element being so constructed and arranged that the pivot is moved longitudinally of the lever in accordance with changes in the modulus of elasticity of the Bourdon tube due to temperature changes.

5. A dial type instrument wherein a gear segment, mounted upon one arm of a lever, engages a pinion on a rotary staff carrying an index, the pivotal axis of the lever being bodily movable about the axis of the staff for calibration purposes and wherein motion-transmitting connections unite the second arm of the lever to a Bourdon tube, characterized in that the second arm of the lever comprises relatively movable parts, one being a terminal element to which one end of a link is pivotally connected, the other end of the link being connected to the tube tip, and a bimetallic device uniting said terminal element to another portion of said second lever arm, the initial position of the link being variable by moving the lever axis bodily about the axis of the staff, the bimetallic device being constructed and arranged to move the terminal element lengthwise of the lever further away from the fulcrum of said lever corresponding to changes in the modulus of elasticity of the tube resultant from temperature increase.

6. A dial type instrument wherein a gear segment, mounted upon one arm of a lever, engages a pinion on a rotary staff carrying an index and wherein motion-transmitting connections unite the second arm of the lever to a stiff but bendable tip-bracket forming the end portion of a Bourdon tube, characterized in that the second arm of the lever comprises relatively movable parts, one being a terminal element to which one end of a link is connected, the other end of the link being connected to the bendable tip-bracket of the tube, and a bimetallic device uniting said terminal element to another portion of said second lever arm, the initial position of the link being variable by bending the tube tip-bracket, the bimetallic element being constructed and arranged to move the terminal element longitudinally of the lever further away from the fulcrum of said lever corresponding to changes in the modulus of elasticity of the Bourdon tube resultant from temperature increase.

7. A dial type instrument including a Bourdon tube and wherein a gear segment, mounted upon one arm of a lever, engages a pinion on a rotary staff carrying an index, and wherein one end of a link, whose other end is attached to the tube tip, is united by a pivot to a second arm of the lever, characterized in that said second arm of the lever comprises inner and outer parts which are so relatively movable as to shift the pivot lengthwise of the lever and relatively to the fulcrum axis of the lever, and temperature responsive means for so relatively moving said parts of the second lever arm as to change the effective length of said second lever arm in accordance with changes in the modulus of elasticity of the Bourdon tube but without affecting the position of the gear segment, said temperature responsive means comprising an elongate, bi-metallic element bent to provide two angularly disposed portions, one of which extends substantially parallel to the longitudinal axis of the lever and which is fixed to the inner part of the second lever arm, and the other of which extends transversely of said axis and which is connected to the outer part of said second lever arm.

8. A dial type Bourdon tube instrument including a Bourdon tube and wherein a gear segment, mounted upon one arm of a lever, engages a pinion on a rotary staff carrying an index, and wherein one end of a link, whose opposite end is attached to the tube tip, is united by a pivot to a second arm of the lever, the link transmitting motion from the tube tip to the lever, characterized in that said second arm of the lever comprises relatively movable parts, one being a terminal element to which one end of the link is connected by said pivot, and means connecting the terminal element to the other portion of said second lever arm, said connecting means including a bi-metallic element so constructed and arranged as, in response to changes in ambient temperature, to move the pivot lengthwise of the longitudinal axis of the lever and relatively to the fulcrum axis of the latter thereby to change the effective length of the second lever arm in accordance with changes in the modulus of elasticity of the Bourdon tube without thereby affecting the position of the gear segment.

9. A dial type Bourdon tube instrument including a Bourdon tube and wherein a gear segment, mounted upon one arm of a lever, engages a pinion on a rotary staff carrying an index, and wherein one end of a link, attached at its other end to the tube tip, is united by a pivot to a second arm of the lever thereby to transmit motion from the tube tip to the lever, characterized in that the second arm of the lever comprises main and terminal parts and a bi-metallic element connecting said parts, said bi-metallic element including angularly disposed inner and outer portions, means operatively connecting the inner portion of the bi-metallic element to a longitudinal edge of the main portion of the second lever arm, the outer portion of the bi-metallic element extending transversely of the length of the longitudinal axis of the lever and comprising a tab disposed in a plane substantially parallel to the plane of the main portion of the second lever arm, the tab having an aperture which receives the aforesaid pivot, the axis of the pivot being parallel to the fulcrum axis of the lever, the bi-metallic element being so constructed and arranged that, in response to temperature changes, the angle between its inner and outer parts varies thereby moving the pivot toward or from the fulcrum axis of the lever longitudinally of the lever and without substantially affecting the position of the segment.

ROBERT J. INGHAM, Jr.